UNITED STATES PATENT OFFICE.

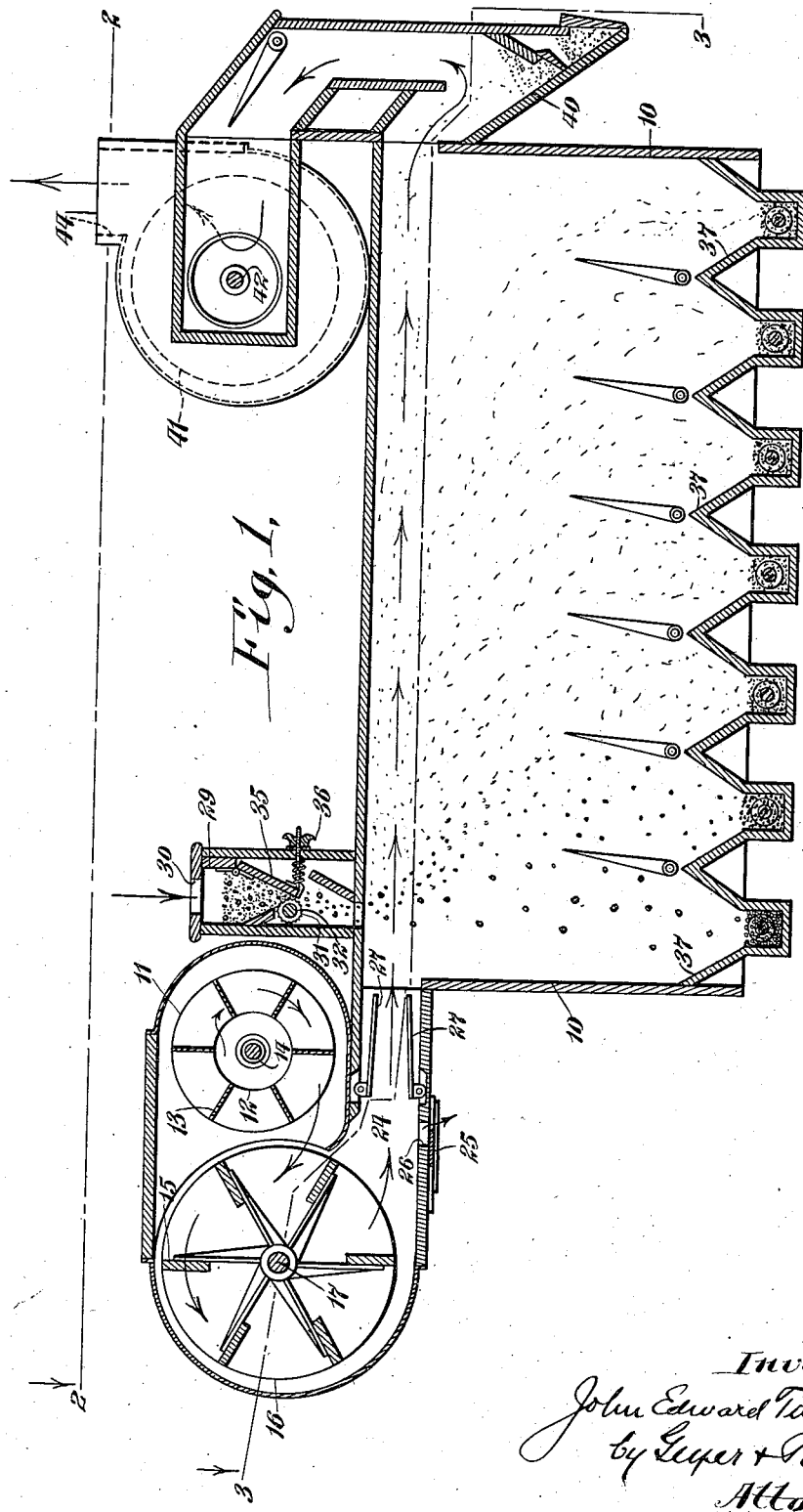

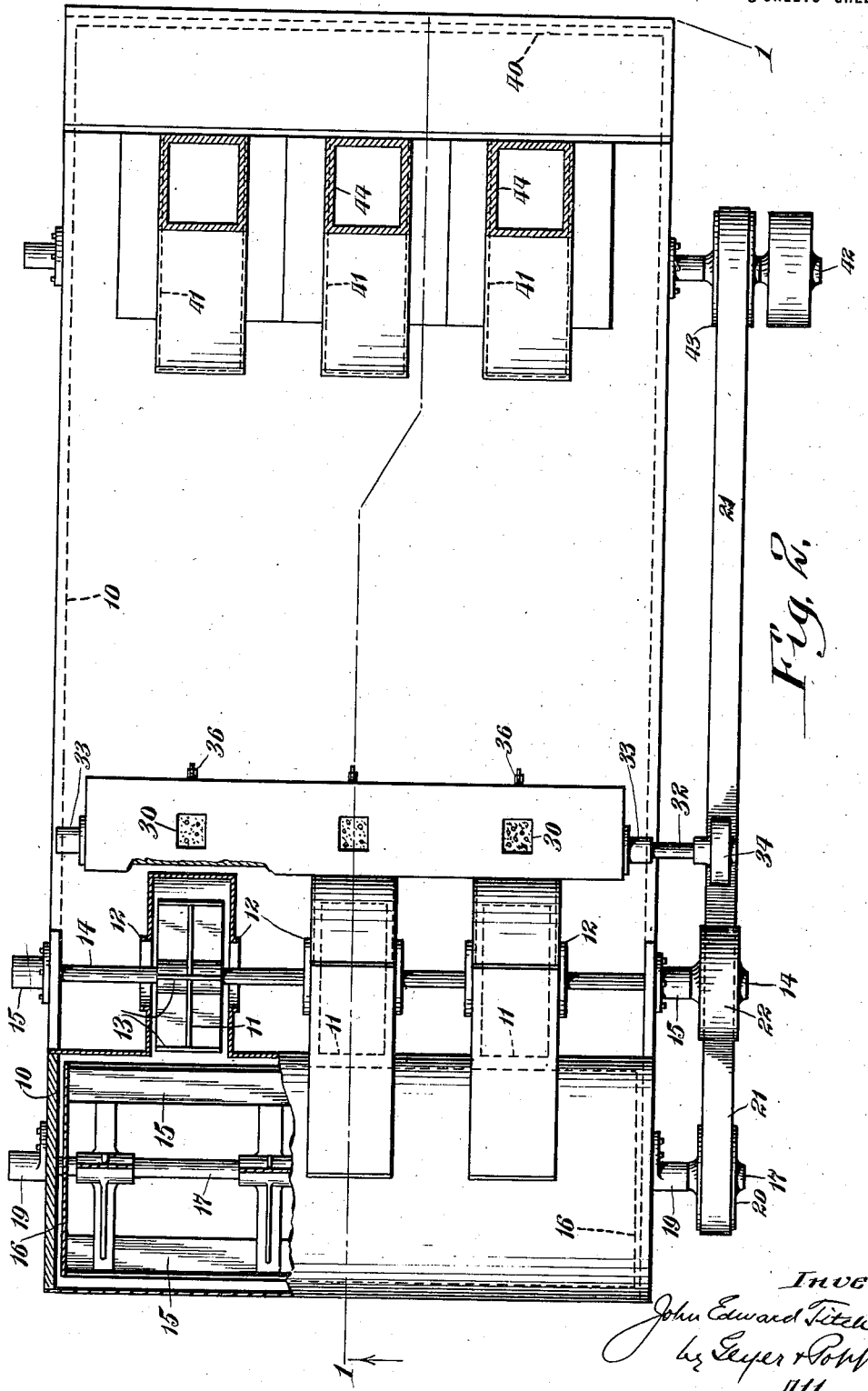

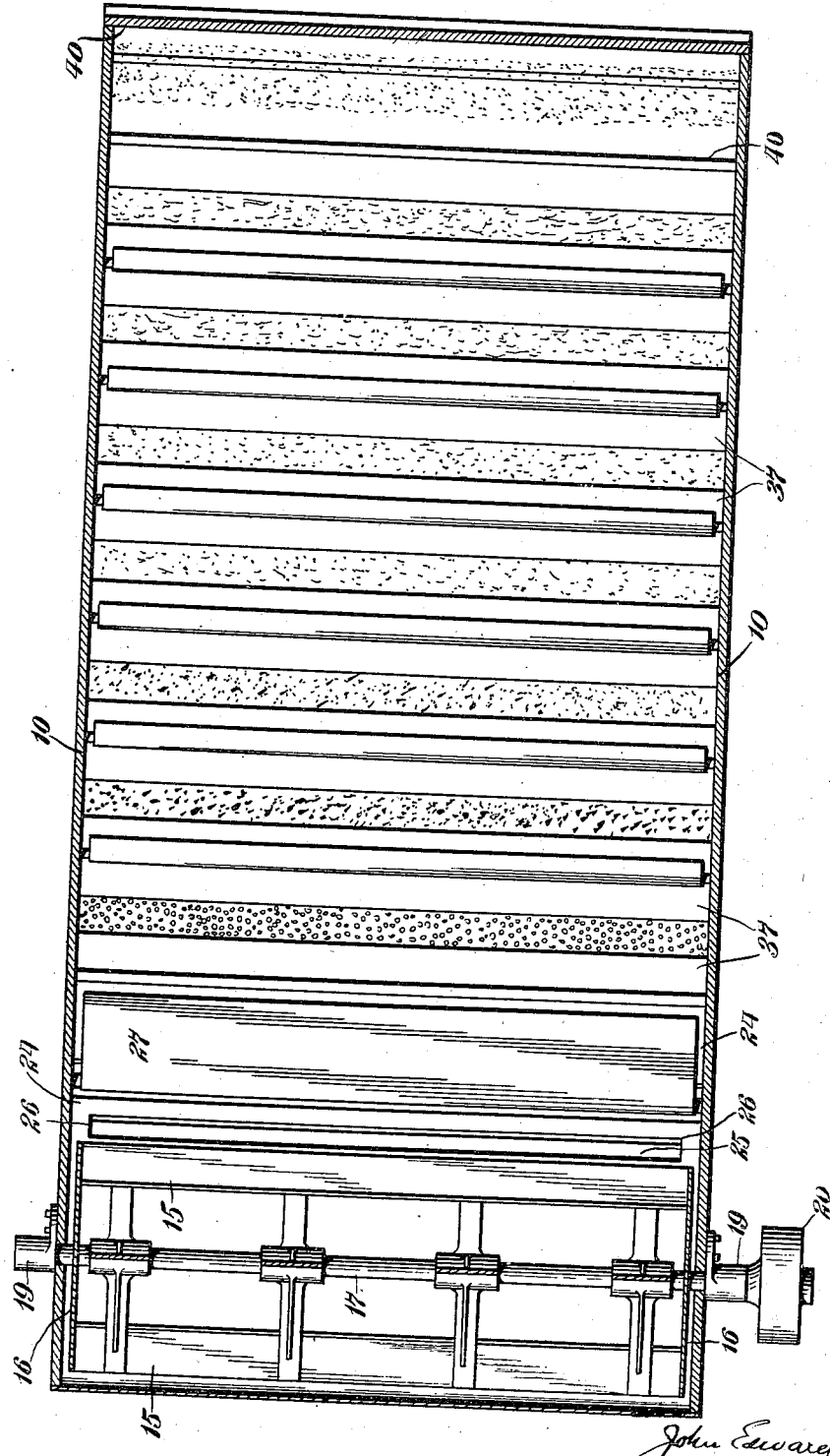

JOHN EDWARD TITCHMARSH, OF SILVER CREEK, NEW YORK.

SEPARATING MACHINE.

1,420,593.

Specification of Letters Patent.   Patented June 20, 1922.

Application filed August 31, 1920. Serial No. 407,086.

*To all whom it may concern:*

Be it known that I, JOHN E. TITCHMARSH, a subject of the King of England, residing in Silver Creek, in the county of Chautauqua and State of New York, have invented new and useful Improvements in Separating Machines, of which the following is a specification.

This invention relates more particularly to separating machines such as are employed for separating ungraded seeds or grains into different grades or sizes by means of an air current or blast.

The object of the invention is to provide such machines with simple means for equalizing the air blast across the full width of the separating chamber, so as to effect a uniform separation of the several grades of materials.

In the accompanying drawings: Figure 1 is a vertical longitudinal section of a seed and grain separator embodying the invention, the plane of the section being on line 1—1, Fig. 2. Figure 2 is a horizontal section taken on line 2—2, Fig. 1. Figure 3 is a horizontal section taken on line 3—3, Fig. 1.

Similar characters of reference indicate corresponding parts throughout the several views.

10 represents the box-like enclosure or separating chamber which comprises the principal part of the machine. Arranged in a transverse row above said compartment are a number of air feeders, preferably consisting of rotary fans 11, which draw air inwardly through eyes 12 of their casings and deliver the same at the peripheries of their blades 13. Said fans are all connected to and driven by a single shaft 14 which is arranged transversely in the frame of the machine and journaled in suitable bearings 15. The compressed air or blast which is thrown off from the blades 13 of said multiple feeder fans, passes forwardly between the upper vanes 15 of a comparatively large equalizing fan 16, thus supplying air to the latter at different points in its width. This blast equalizer or equalizing fan extends completely across the machine and unlike the feeder fans, its case has no eyes but is closed at its ends, so as to receive its air supply solely from the feeder fans. This equalizing fan is mounted on and driven by a transverse shaft 17 which is journaled in bearings 19 on the frame of the machine. This shaft carries a belt pulley 20 around which passes a power-transmission belt 21, the latter also frictionally engaging with and thereby driving an intermediate belt pulley 22 which is secured to the adjacent end of the feeder fan shaft 14.

The air blast delivered by the equalizing fan 16 passes rearwardly through a throat 24 leading into the chamber 10 and extending from side to side thereof. The pressure of the air may be controlled by a horizontally slidable relief valve 25 applied to a relief opening or passage 26 of said throat. If the air pressure is excessive, this relief valve is opened to allow some of the compressed air to vent into the outer atmosphere. If, on the contrary, the air pressure is too low, said relief opening 26 is partially or wholly closed. The air blast into and through the chamber 10 is further adapted to be controlled by means of a pair of vertically adjustable throat valves 27 pivoted at their forward ends while their free rear ends are adjustable toward and from the center of said throat, thereby more or less constricting the flow of air through the same.

Arranged above the air blast which issues from the throat 24 is a feed hopper 29 which is supplied from time to time with ungraded seed, grain or other material through suitable openings 30. This ungraded seed or grain is discharged from said hopper in a thin, uniform sheet by means of a fluted roller 31 which is driven by a transverse shaft 32 journaled on the main frame in bearings 33 and carrying a pulley 34 which is driven by the belt 21. The discharge of the ungraded material from the hopper 29 may be further controlled by a hinged door 35 which is movable toward and from said roller 31 and which is adjusted to the desired position by means of a number of wing nuts 36 which engage with the threaded ends of longitudinal adjusting bolts whose forward ends are pivoted to the free lower end of said hinged door 35.

As the ungraded seed or grain falls in a constant stream through the air blast, the heavier or denser seeds are of course less affected by the air blast than are the lighter seeds and chaff. Consequently the descending seeds, grain and chaff are graded automatically as they fall, under the influence of gravity, into a plurality of separating bins 37 arranged in the bottom of the chamber 10, one beyond another, the bins which are located at the front of the machine receiving the heavier seeds, the intermediate bins the lighter seeds and the rearmost bins most of the chaff and light refuse. Such chaff as still remains in the air current is deposited in a waste bin 40. While not absolutely necessary it is preferable to employ, at the rear end of the machine, a number of exhaust fans 41 which are arranged in a transverse row and driven by a shaft 42 and belt pulley 43 around which the belt 21 runs, said exhaust fans acting to suck air from the rear upper portion of the separating chamber 10. By the use of these exhaust fans, a substantially unvarying velocity of air blast is obtained in a direction lengthwise of the machine, the air being discharged vertically from the fan spouts 44.

In the operation of the machine, the multiple feeder fans 11 supply air to the single equalizing fan 16 which in turn delivers a blast through the separating chamber 10, and as this equalizer member is coextensive with the width of said chamber, the blast is of uniform force from side to side of the chamber, with the result that a correspondingly uniform separation or grading of the seeds or other materials is effected.

While the improvement is herein shown and described in connection with a grain or seed separator, it is obviously useful in various other machines of this general character where it is desirable to equalize an air blast across a given area or chamber. I do not therefore wish to be limited to the particular embodiment of the invention disclosed herein.

I claim as my invention:

1. The combination of a chamber, an air current equalizer extending across said chamber, and a plurality of feeders for supplying air to said equalizer at different points thereof.

2. The combination of a chamber, an equalizing fan extending from side to side of said chamber, and a plurality of feeder fans for supplying air to said equalizing fan at different points crosswise of said chamber.

3. The combination of a chamber, an equalizing fan extending from side to side of said chamber and having a casing provided with closed ends, and a plurality of feeder fans for supplying air to said equalizing fan at different points crosswise of said chamber.

4. A chamber provided at its front and rear ends with an inlet and an outlet, respectively, said inlet extending across the entire width of said chamber, an equalizing fan extending entirely across said chamber and having its casing provided with a delivery conduit which opens into said inlet throughout the full width of the same, and a plurality of feeder fans arranged in a row transversely of said chamber and discharging into different parts of the casing of said equalizing fan.

JOHN EDWARD TITCHMARSH.